(12) United States Patent
Kwon

(10) Patent No.: US 8,054,205 B2
(45) Date of Patent: Nov. 8, 2011

(54) METHOD OF COMPOSING AND OPERATING DATA INPUT KEY ARRAY AND APPARATUS EMPLOYING THE SAME

(75) Inventor: Seong-Geun Kwon, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1483 days.

(21) Appl. No.: 11/505,291

(22) Filed: Aug. 17, 2006

(65) Prior Publication Data

US 2007/0041580 A1    Feb. 22, 2007

(30) Foreign Application Priority Data

Aug. 18, 2005    (KR) .................. 10-2005-0075722

(51) Int. Cl.
*H03M 11/02*    (2006.01)

(52) U.S. Cl. ....... 341/22; 341/35; 379/433.07; 345/168; 345/169

(58) Field of Classification Search .............. 345/168, 345/169; 379/433.07
See application file for complete search history.

(56) References Cited

U.S. PATENT DOCUMENTS

| | | | | |
|---|---|---|---|---|
| 5,528,235 | A * | 6/1996 | Lin et al. | 341/22 |
| 6,963,332 | B1 * | 11/2005 | Watanabe | 345/161 |
| 2004/0212597 | A1 * | 10/2004 | Nuovo et al. | 345/168 |
| 2006/0163337 | A1 * | 7/2006 | Unruh | 235/145 A |
| 2007/0205920 | A1 * | 9/2007 | Cho | 341/35 |

FOREIGN PATENT DOCUMENTS

CN    1416049    5/2003

* cited by examiner

*Primary Examiner* — Timothy Edwards, Jr.
(74) *Attorney, Agent, or Firm* — Roylance, Abrams, Berdo & Goodman, L.L.P.

(57) ABSTRACT

An apparatus and method are provided for composing a data input key array with a plurality of keys wherein multiple character groups are assigned to respective ones of the plurality of keys, each of the multiple character groups comprising multiple characters. The multiple characters of each character group are arranged on the corresponding key in the same pattern as the multiple character groups on the data input key array. The data input key array may operate by selecting a particular key assigned with a desired character, and selecting a key disposed to correspond with the position of the desired character on the particular key, thereby displaying the desired character. The data input key array may also be operated by selecting a particular key assigned to a desired character by inputting one of the directional keys, the directional key being disposed to correspond with the position of the particular key.

41 Claims, 2 Drawing Sheets

| 1 QZ | 2 ABC | 3 DEF |
|---|---|---|
| 4 GHI | 5 JKL | 6 MNO |
| 7 PRS | 8 TUV | 9 WXY |
| ✶ | 0 | # |

FIG.1

(CONVENTIONAL ART)

METHOD OF COMPOSING AND OPERATING DATA INPUT KEY ARRAY AND APPARATUS EMPLOYING THE SAME

CROSS REFERENCE TO RELATED APPLICATIONS

This application claims the benefit under 35 U.S.C. §119 (a) from Korean Patent Application Serial No. 2005-75722 filed in the Korean Industrial Property Office on Aug. 18, 2005, the entire disclosure of which is hereby incorporated by reference.

BACKGROUND OF THE INVENTION

1. Field of the Invention

The present invention relates to a method of composing and operating a data input key array and an apparatus using the inventive data input key array. More particularly, the present invention relates to a method and apparatus which facilitate key operation when inputting character data through the data input key array.

2. Description of the Related Art

The conventional mobile phone has a data input key array comprising a plurality of keys representing characters and symbols, whereby the user may input desired characters by selecting or pressing the keys assigned with the desired characters.

The data input key array consists of a plurality of basic numeric keys represented by respective Arabic numbers and a few auxiliary keys. In addition, each numeric key is assigned usually with two or more letters, for example English language characters, whereby the user may input character data by pressing the key one to three times. However, it is an inconvenience to the user to operate a key three times in order to input one character.

Referring to FIG. 1 for illustrating the conventional data input key array, in order to input the word "LOVE", the user must select or press key numbered "5" three times to input character "L", key number "6" three times to input character "O", key numbered "8" three times to input character "V", and then key numbered "3" twice to input character "E".

Accordingly, there is a need for an improvement in composing and operating data input key array.

SUMMARY OF THE INVENTION

An exemplary object of the present invention is to provide a method of composing a data input key array facilitating the key input operation and an apparatus using the same.

According to an exemplary aspect of the present invention, an apparatus and method are provided for composing a data input key array with a plurality of keys in which multiple character groups are assigned to respective ones of the plurality of keys, each of the multiple character groups comprising multiple characters. The multiple characters of each character group are arranged on the corresponding key in the same pattern as the multiple character groups on the data input key array.

According to another exemplary aspect of the present invention, an apparatus and method are provided for composing a data input key array with a plurality of keys in which multiple character groups are assigned respectively to selected ones of the plurality of keys, each of the multiple character groups comprising multiple characters. The multiple characters of each character group are arranged on the corresponding key in the same pattern as the multiple character groups on the data input key array.

According to still another exemplary aspect of the present invention, an apparatus and method for composing a data input key array with a plurality of keys are provided as follows. Arabic numeral "1" is assigned to the first key at the left end of the first row of the keys in the data input key array, the order of numbering the keys starting from the left end of the first row to the right end of the last row, a character group of five characters a, b, c, d and e is assigned to the second key in the first row, and Arabic numeral 3 is assigned to the third key in the first row. A character group of five characters f, g, h, i and j is assigned to the fourth key in the second row, a character group of five characters k, l, m, n and o is assigned to the fifth key in the second row, and a character group of five characters p, q, r, s and t is assigned to the sixth key in the second row. Arabic numeral "7" is assigned to the seventh key in the third row, a character group of five characters u, v, w, x and y is assigned to the eighth key in the third row, and Arabic numeral 9 is assigned to the ninth key in the third row; and graphic symbol "*" is assigned to tenth key in the fourth row, Arabic numeral "0" to the eleventh key in the fourth row, and graphic symbol # to the twelfth key in the fourth row.

According to still another exemplary aspect of the present invention, an apparatus and method for operating a plurality of keys provided in a data input key array are provided in which a first input mode is switched to if the particular numeric key assigned with a desired character among the numeric keys in the data input key array is selected in character input mode, and a second input mode to display the desired character is switched to if the numeric key disposed in the data input key array so as to correspond with the desired character disposed in the particular numeric key is selected.

According to still a further exemplary aspect of the present invention, an apparatus and method for operating a plurality of keys provided in a data input key array are provided in which the key disposed so as to correspond with the position of a desired character assigned to a particular key among the plurality of keys is selected, and the particular key assigned with the desired character to display the character inputted is selected.

According to still a further exemplary aspect of the present invention, an apparatus and method of operating a plurality of keys provided in a data input key array are provided in which a first input mode is switched to if the numeric key disposed in the data input key array so as to correspond with a desired character assigned to a particular numeric key is selected in character input mode; and a second input mode to display the desired character is switched to if the particular numeric key assigned with the desired character is selected in the first input mode.

According to still a further exemplary aspect of the present invention, an apparatus and method for operating a plurality of keys provided in a data input key array are provided in which the particular key assigned with a desired character among the plurality of keys is selected by inputting one of the directional keys included in the data input key array, the one directional key being disposed so as to correspond with the particular key; and one of the directional keys disposed so as to correspond with the position of the desired character disposed on the particular key is selected, thereby displaying the desired character inputted.

According to still a further exemplary aspect of the present invention, an apparatus and method for operating a plurality of keys provided in a data input key array are provided in which a first input mode is switched to if the particular numeric key assigned with a desired character among numeric keys included in the data input key array is selected in character input mode by inputting one of directional keys disposed so as to correspond with the particular numeric key, and a second input mode to display the desired character is switched to if one of the directional keys disposed so as to correspond with the position of the desired character on the particular numeric key is selected.

According to still a further exemplary aspect of the present invention, an apparatus and method for operating a plurality of keys provided in a data input key array are provide in which one of directional keys included in the input key array disposed so as to correspond with the position of a desired character assigned to a particular numeric key is selected. The particular key assigned with the desired character is selected by inputting one of the directional keys disposed so as to correspond with the particular key, thereby displaying the desired character.

According to still a further exemplary aspect of the present invention, an apparatus and method for operating a plurality of keys provided in a data input key array are provided in which a first input mode is switched to if one of directional keys included in the input key array disposed so as to correspond with the position of a desired character assigned to a particular numeric key is selected, and a second input mode to display the desired character is switched to if the particular numeric key is selected by inputting the directional key disposed so as to correspond with the particular numeric key.

Exemplary embodiments of the present invention will now be described more specifically with reference to the drawings attached only by way of example.

BRIEF DESCRIPTION OF THE DRAWINGS

The above and other objects, features and advantages of certain exemplary embodiments of the present invention will be more apparent from the following description taken in conjunction with the accompanying drawings, in which;

FIG. 1 is a diagram for illustrating the conventional data input key array.

DETAILED DESCRIPTION OF THE EXEMPLARY EMBODIMENTS

Figure 2:
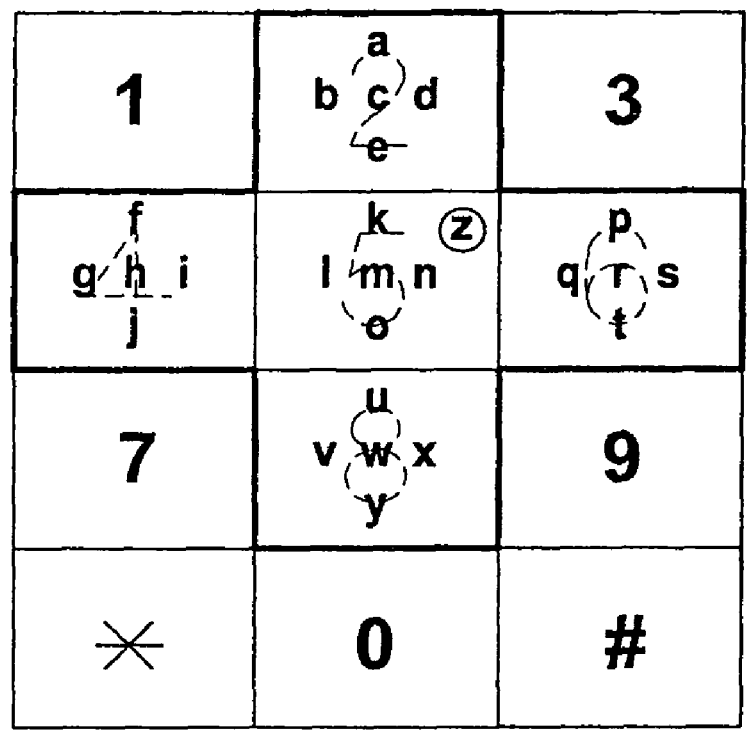
FIG. 2 is a diagram for illustrating an improved data input key array according to an exemplary embodiment of the present invention.

Throughout descriptions in connection with the drawings, the same reference numerals are used to represent the same functional parts. In addition, there are omitted detailed descriptions of the conventional parts for clarity and conciseness.

Referring to FIG. 2, a data input key array according to an exemplary embodiment of the present invention has 12 keys consisting of three columns by four rows. The nine keys included in the first, second and third rows counted from the upper end in the drawing are successively numbered 1 to 9, and the three keys included in the fourth row are assigned successively with "*", "0" and "#". In this exemplary embodiment, English language characters are divided into multiple character groups, for example, five groups each assigned to one of the five keys numbered "2", "4", "5", "6" and "8" forming a cruciform in the first, second and third rows. The cruciform is represented by thick solid lines in the drawing.

In an exemplary implementation, the first character group consists of five characters a, b, c, d and e assigned to the second key numbered "2". The five characters a, b, c, d and e are also disposed on the second key numbered "2" so as to have the same cruciform as the five keys numbered "2", "4", "5", "6" and "8". Character "a" is operatively connected with the corresponding second key numbered "2", "b" the corresponding fourth key numbered "4", "c" the corresponding fifth key numbered "5", "d" the corresponding sixth key numbered "6", and "e" the corresponding eighth key numbered "8".

In the exemplary embodiment of the present description, the phrase "operatively connected" means that character "a" is input by the second key, "b" by the fourth key, "c" by the fifth key, "d" by the sixth key, and "e" by the eighth key. If one of the five characters "a", "b", "c", "d" and "e" in the first character group is to be input, the second key is first pressed, and then the corresponding key in the solid cruciform operatively connected with the desired character is pressed. For example, in order to input character "a", the second key is pressed twice, once for selecting the first character group and once for inputting the data of character "a".

In another exemplary embodiment, the first character group of "a", "b", "c", "d" and "e" may be input by using directional keys provided in the data input key array. The directional keys (not shown) are upper, left, central, right and lower keys, designed so as to functionally correspond with the second, fourth, fifth, sixth and eighth keys previously mentioned.

In this exemplary embodiment, the characters "a", "b", "c", "d" and "e" assigned to the second key numbered "2" may be input by the directional keys. For example, "a" is input by pressing twice the upper directional key, "b" by pressing the upper directional key and then the left directional key, "c" by pressing the upper directional key and then the central directional key, "d" by pressing the upper directional key and then the right directional key, and "e" by pressing the upper directional key and then the lower directional key.

In another exemplary embodiment, "b" is input by pressing the left directional key and then the upper directional key, "c" by pressing the central directional key and then the upper directional key, "d" by pressing the right directional key and then the upper directional key, and "e" by pressing the lower directional key and then the upper directional key.

Likewise, the second character group may consist of five characters "f", "g", "h", "i" and "j" assigned to the fourth key, the third character group of "k", "l", "m", "n" and "o" assigned to the fifth key, the fourth character group of "p", "q", "r", "s" and "t" assigned to the sixth key, and the fifth character group of "u", "v", "w", "x" and "y" assigned to the eighth key.

Describing the second character group assigned to the fourth key, character "f" is operatively connected with the corresponding second key numbered "2", "g" the corresponding fourth key numbered "4", "h" the corresponding fifth key numbered "5", "i" the corresponding sixth key numbered "6", and "j" the corresponding eighth key numbered "8". Hence, character "f" is input by the second key, "g" by the fourth key, "h" by the fifth key, "i" by the sixth key, and "j" by the eighth key.

In an exemplary embodiment, if one of the five characters "f", "g", "h", "i" and "j" in the second character group is to be input, the fourth key is first pressed, and then the corresponding key in the solid cruciform operatively connected with the desired character is pressed. In another exemplary embodiment, the corresponding key in the solid cruciform operatively connected with a desired character in the fourth key is first pressed, and then the fourth key is pressed.

In yet another exemplary embodiment, the characters "f", "g", "h", "i" and "j" assigned to the fourth key numbered "4" may be inputted by the directional keys. For example, "f" is input by pressing the left directional key and then the upper directional key, "g" by pressing twice the left directional key, "h" by pressing the left directional key and then the central directional key, "i" by pressing the left directional key and then the right directional key, and "j" by pressing the left directional key and then the lower directional key.

In another embodiment, "f" is input by pressing the upper directional key and then the left directional key, "h" by pressing the central directional key and then the left directional key, "i" by pressing the right directional key and then the left directional key, and "j" by pressing the lower directional key and then the left directional key.

Similarly, the third character group assigned to the fifth key may comprise character "k" operatively connected with the corresponding second key numbered "2", "l" the corresponding fourth key numbered "4", "m" the corresponding fifth key numbered "5", "n" the corresponding sixth key numbered "6", and "o" the corresponding eighth key numbered "8". Hence, character "k" is input by the second key, "l" by the fourth key, "m" by the fifth key, "n" by the sixth key, and "o" by the eighth key.

In an exemplary embodiment, if one of the five characters "k", "l", "m", "n" and "o" in the third character group is to be input, the fifth key is first pressed, and then the corresponding key in the solid cruciform operatively connected with the desired character is pressed. In another exemplary embodiment, the corresponding key in the solid cruciform operatively connected with a desired character in the fifth key is first pressed, and then the fifth key is pressed.

In yet another exemplary embodiment, the characters "k", "l", "m", "n" and "o" assigned to the fifth key numbered "5" may be input by the directional keys. For example, "k" is input by pressing the central directional key and then the upper directional key, "l" by pressing the central directional key and then the left directional key, "m" by pressing twice the central directional key, "n" by pressing the central directional key and then the right directional key, and "o" by pressing the central directional key and then the lower directional key.

In another exemplary embodiment, "k" is input by pressing the upper directional key and then the central directional key, "l" by pressing the left directional key and then the central directional key, "n" by pressing the right directional key and then the central directional key, and "o" by pressing the lower directional key and then the central directional key.

Similarly, the fourth character group assigned to the sixth key may comprise character "p" operatively connected with the corresponding second key numbered "2", "q" with the corresponding fourth key numbered "4", "r" with the corresponding fifth key numbered "5", "s" with the corresponding sixth key numbered "6", and "t" with the corresponding eighth key numbered "8". Hence, character "p" is input by the second key, "q" by the fourth key, "r" by the fifth key, "s" by the sixth key, and "t" by the eighth key.

In an exemplary embodiment, if one of the five characters "p", "q", "r", "s" and "t" in the fourth character group is to be input, the sixth key is first pressed, and then the corresponding key in the solid cruciform operatively connected with the desired character is pressed. In another exemplary embodiment, the corresponding key in the solid cruciform operatively connected with a desired character in the sixth key is first pressed, and then the sixth key is pressed.

In yet another exemplary embodiment, the characters "p", "q", "r", "s" and "t" assigned to the sixth key numbered "6" may be input by the directional keys. For example, "p" is input by pressing the right directional key and then the upper directional key, "q" by pressing the right directional key and then the left directional key, "r" by pressing the right directional key and the central directional key, "s" by pressing twice the right directional key, and "t" by pressing the right directional key and then the lower directional key.

In another exemplary embodiment, "p" is input by pressing the upper directional key and then the right directional key, "q" by pressing the left directional key and then the right directional key, "r" by pressing the central directional key and then the right directional key, and "t" by pressing the lower directional key and then the right directional key.

Similarly, the fifth character group assigned to the eighth key may comprise character "u" operatively connected with the corresponding second key numbered "2", "v" with the corresponding fourth key numbered "4", "w" with the corresponding fifth key numbered "5", "x" with the corresponding sixth key numbered "6", and "y" with the corresponding eighth key numbered "8". Hence, character "u" is input by the second key, "v" by the fourth key, "w" by the fifth key, "x" by the sixth key, and "y" by the eighth key.

In an exemplary embodiment, if one of the five characters "u", "v", "w", "x" and "y" in the fifth character group is to be input, the eighth key is first pressed, and then the corresponding key in the solid cruciform operatively connected with the desired character is pressed. In another exemplary embodiment, the corresponding key in the solid cruciform operatively connected with a desired character in the eighth key is first pressed, and then the eighth key is pressed.

In yet another exemplary embodiment, the characters assigned "u", "v", "w", "x" and "y" to the eighth key numbered "8" may be input by the directional keys. For example, "u" is input by pressing the lower directional key and then the upper directional key, "v" by pressing the lower directional key and then the left directional key, "w" by pressing the lower directional key and the central directional key, "x" by pressing the lower directional key and then the right directional key, and "y" by pressing twice the lower directional key.

In another exemplary embodiment, "u" is input by pressing the upper directional key and then the lower directional key, "v" by pressing the left directional key and then the lower directional key, "w" by pressing the central directional key and then the lower directional key, and "x" by pressing the right directional key and then the lower directional key.

The remaining character "z" not specifically mentioned in the foregoing description may be designed so as to be input by continuous pressing of the fifth key numbered "5" for a period of time. Besides, the switching between the capital and the small letter may be performed by pressing a particular key or through a selection menu.

Describing an exemplary procedure for inputting the word "LOVE" by using the data input key array composed by the inventive method, the first character "L" is input by successively pressing the fifth key and then the fourth. Likewise, the second character "O" is inputted by successively pressing the fifth key and then the eighth, the third character "V" by the eighth key and then the fourth key, and the fourth character "E" by the second key and then the eighth key. In another exemplary embodiment, the first character "L" is input by successively pressing the fourth key and then the fifth. Likewise, the second character "O" is input by successively pressing the eighth key and then the fifth, the third character "V" by the fourth key and then the eighth key, and the fourth character "E" by the eighth key and then the second key.

In yet another exemplary embodiment, the word "LOVE" may be input by using the directional keys. Namely, the first character "L" is input by successively pressing the central directional key and then the left directional key. Likewise, the second character "O" is input by successively pressing the central directional key and then the lower directional key, the third character "V" by the lower directional key and then the left directional key, and the fourth character "E" by the upper directional key and then the lower directional key. In another exemplary embodiment, the first character "L" is input by successively pressing the left directional key and then the central directional key. Likewise, the second character "O" is input by successively pressing the lower directional key and then the central directional key, the third character "V" by the left directional key and then the lower directional key, and the fourth character "E" by the lower directional key and then the upper directional key.

Thus, exemplary implementations of the present invention may enable the user to input an English language character by performing the key operation only twice. While the present invention has been shown and described with reference to certain exemplary embodiments thereof, it will be readily apparent to those skilled in the art that various changes and modifications may be made thereto without departing from the spirit and scope of the present invention as defined by the appended claims, including the full scope of equivalents thereof.

What is claimed is:

1. A method of composing a data input key array, the method comprising the steps of:
   assigning multiple character groups to respective ones of a plurality of keys, each of said multiple character groups comprising multiple characters;
   arranging the multiple characters of each character group on the corresponding key in the same cruciform pattern; and
   arranging said multiple character groups on said data input key array in a cruciform pattern.

2. The method as defined in claim 1, wherein a specified one of the multiple characters is input by continuous pressing of a specific key for a time period.

3. The method as defined in claim 1, wherein said data input key array comprises an arrangement of numeric keys.

4. A method of composing a data input key array, the method comprising the steps of:
   assigning multiple character groups respectively to selected ones of a plurality of keys, each of said multiple character groups comprising multiple characters; and
   arranging the multiple characters of each character group on the corresponding key in the same cruciform pattern; and
   arranging said multiple character groups in said data input key array in a cruciform pattern.

5. A method as defined in claim 4, wherein a specified one of the characters is input by continuous pressing of a specific key for a time period.

6. A method as defined in claim 4, wherein said data input key array comprises an arrangement of numeric keys.

7. A method of composing a data input key array, the method comprising the steps of:
   assigning a first numeral to a first key at a left end of a first row of keys in a data input key array, the order of numbering the keys starting from the left end of the first row to a right end of a last row, a first character group of five characters to a second key in the first row, and a third numeral to a third key in the first row;
   assigning a second character group of five characters to a fourth key in a second row, a third character group of five characters to a fifth key in the second row, and a fourth character group of five characters to a sixth key in the second row;
   assigning a seventh numeral to a seventh key in a third row, a fifth character group of five characters to an eighth key in the third row, and a ninth numeral to the ninth key in the third row; and
   assigning a first graphic symbol to a tenth key in a fourth row, an eleventh numeral to an eleventh key in the fourth row, and a second graphic symbol to a twelfth key in the fourth row.

8. The method as defined in claim 7, wherein a twenty-sixth character is input by continuous pressing of a specific key for a time period.

9. The method as defined in claim 8, wherein the twenty-sixth character is assigned to the fifth key.

10. The method as defined in claim 7, wherein the positions of the characters of the first character group are patterned on the second key so as to correspond with the second, fourth, fifth, sixth and eighth keys, respectively.

11. The method as defined in claim 7, wherein the characters of the first character group assigned to the second key are input respectively by the second, fourth, fifth, sixth and eighth keys.

12. The method as defined in claim 7, wherein the characters of the first character group assigned to the second key are arranged so as to respectively correspond with upper key, left key, central key, right key, and lower key of directional keys of said data input key array.

13. The method as defined in claim 7, wherein the characters of the first group assigned to the second key are input respectively by upper, left, central, right, and lower keys of directional keys of said data input key array.

14. The method as defined in claim 7, wherein the positions of the characters of the second character group are patterned on the fourth key so as to correspond with the second, fourth, fifth, sixth and eighth keys, respectively.

15. The method as defined in claim 7, wherein the characters of the second character group assigned to the fourth key are input respectively by the second, fourth, fifth, sixth and eighth keys.

16. The method as defined in claim 7, wherein the characters of the second character group assigned to the fourth key are arranged so as to respectively correspond with upper, left, central, right, and lower keys of directional keys of said data input key array.

17. The method as defined in claim 7, wherein the characters of the second character group assigned to the fourth key are input respectively by upper, left, central, right, and lower keys of directional keys of said data input key array.

18. The method as defined in claim 7, wherein the positions of the characters of the third character group are patterned on the fifth key so as to correspond with the second, fourth, fifth, sixth and eighth keys, respectively.

19. A method as defined in claim 7, wherein the characters of the third character group assigned to the fifth key are input respectively by the second, fourth, fifth, sixth and eighth keys.

20. The method as defined in claim 7, wherein the characters of the third character group assigned to the fifth key are arranged so as to respectively correspond with upper, left, central, right, and lower keys of directional keys of said data input key array.

21. The method as defined in claim 7, wherein the characters of the third character group assigned to the fifth key are input respectively by upper, left, central, right, and lower keys of directional keys of said data input key array.

22. The method as defined in claim 7, wherein the positions of the characters of the fourth character group t are patterned on the sixth key so as to correspond with the second, fourth, fifth, sixth and eighth keys, respectively.

23. The method as defined in claim 7, wherein the characters of the fourth character group assigned to the sixth key are input respectively by the second, fourth, fifth, sixth and eighth keys.

24. The method as defined in claim 7, wherein the characters of the fourth character group assigned to the sixth key are arranged so as to respectively correspond with upper, left, central, right, and lower keys of directional keys of said data input key array.

25. The method as defined in claim 7, wherein the characters of the fourth character group assigned to the sixth key are input respectively by upper, left, central, right, and lower keys of directional keys of said data input key array.

26. The method as defined in claim 7, wherein the positions of the characters of the fifth character group are patterned on the eighth key so as to correspond with the second, fourth, fifth, sixth and eighth keys, respectively.

27. The method as defined in claim 7, wherein the characters of the fifth character group assigned to the eighth key are input respectively by the second, fourth, fifth, sixth and eighth keys.

28. The method as defined in claim 7, wherein the characters of the fifth character group assigned to the eighth key are arranged so as to respectively correspond with upper, left, central, right, and lower keys of directional keys of said data input key array.

29. The method as defined in claim 7, wherein the characters of the fifth character group assigned to the eighth key are input respectively by upper, left, central, right, and lower keys of directional keys of said data input key array.

30. A method of operating a plurality of keys provided in a data input key array, comprising the steps of:
assigning multiple character groups to respective ones of a plurality of keys, each of said multiple character groups comprising multiple characters;
arranging the multiple characters of each character group on the corresponding key in the same cruciform pattern;
arranging said multiple character groups on said data input key array in a cruciform pattern;
selecting a key comprising an assigned character from the plurality of keys of the data input key array; and
selecting a key disposed on said data input key array in a position corresponding to a position of said assigned character on said selected key in said data input key array, thereby displaying said assigned character.

31. The method as defined in claim 30, wherein at least one character assigned to at least one of the keys of said data input key array is input and displayed by continuously pressing one of the keys.

32. The method as defined in claim 30, wherein the key selected for inputting said assigned character is a numeric key.

33. A method of operating a plurality of keys provided in a data input key array, comprising the steps of:
assigning multiple character groups to respective ones of a plurality of keys, each of said multiple character groups comprising multiple characters;
arranging the multiple characters of each character group on the corresponding key in the same cruciform pattern;
arranging said multiple character groups on said data input key array in a cruciform pattern;
selecting from the plurality of keys of the data input key array a key disposed in a position corresponding to a position of a character assigned to a particular key of said plurality of keys; and
selecting said particular key comprising said character assigned thereto to display said character.

34. The method as defined in claim 33, wherein at least one character assigned to at least one of the plurality of keys of said data input key array is input and displayed by continuously pressing a particular key.

35. The method as defined in claim 33, wherein the key selected for inputting said character comprises a numeric key.

36. A method of operating a plurality of keys provided in a data input key array, comprising the steps of:
selecting from a plurality of keys of a data input key array a key comprising an assigned character among said plurality of keys by inputting one of a plurality of directional keys, which are distinct from character assigned keys, said one directional key being disposed in a position corresponding to a position of said particular key in said data input key array; and
selecting one of said plurality of directional keys disposed in a position corresponding to the position of said assigned character on said selected key, thereby displaying said assigned character.

37. The method as defined in claim 36, wherein at least one character assigned to at least one of the plurality of keys of said data input key array is input and displayed by continuously pressing one of said directional keys.

38. The method as defined in claim 36, wherein said plurality of directional keys comprise upper, left, central, right, and lower keys.

39. A method of operating a plurality of keys provided in a data input key array, comprising the steps of
selecting one of directional keys, which are distinct from character assigned keys, disposed in a position corresponding to a position of a numeric key of a character assigned to the numeric key; and
selecting said key comprising said character assigned thereto by inputting one of the directional keys disposed in a position corresponding to said selected key, thereby displaying said character.

40. The method as defined in claim 39, wherein at least one character assigned to at least one of the plurality of keys of said data input key array is input and displayed by continuously pressing one of said directional keys.

41. The method as defined in claim 39, wherein said directional keys comprise upper, left, central, right, and lower keys.

* * * * *